United States Patent [19]
Miller

[11] Patent Number: 5,669,176
[45] Date of Patent: Sep. 23, 1997

[54] INSECT TRAP INCLUDING METHANOL FUEL CELL FOR GENERATING CARBON DIOXIDE AND WATER VAPOR AS ATTRACTANTS

[75] Inventor: Mark H. Miller, Hope, R.I.

[73] Assignee: American Biophysics Corp., Jamestown, R.I.

[21] Appl. No.: 559,284

[22] Filed: Nov. 15, 1995

[51] Int. Cl.$^6$ .............................. A01M 1/06; A01M 1/02
[52] U.S. Cl. .......................... 43/139; 43/107; 43/132.1
[58] Field of Search ........................ 43/107, 139, 113, 43/111, 132.1; 429/8, 12

[56] References Cited

U.S. PATENT DOCUMENTS

| | | | |
|---|---|---|---|
| 4,506,473 | 3/1985 | Waters, Jr. | 43/114 |
| 4,785,573 | 11/1988 | Millard | 43/113 |
| 5,205,064 | 4/1993 | Nolen | 43/112 |
| 5,382,422 | 1/1995 | Dieguez et al. | 43/111 |
| 5,417,009 | 5/1995 | Butler et al. | 43/113 |

*Primary Examiner*—Jeanne Elpel
*Attorney, Agent, or Firm*—Salter & Michaelson

[57] ABSTRACT

An insect trap for trapping hematophagous insects utilizes a methanol fuel cell to provide carbon dioxide, water vapor, and heat as attractive agents, and further utilizes electricity generated by the fuel cell to power the electrical components of the trap, thus eliminating the need for an external power source. The fuel cell is mounted in a tubular housing having inlet and outlet ends. The inlet end of a second tubular housing is mounted in spaced adjacent relation to the outlet end of the fuel cell housing. A fan, powered by the fuel cell, is mounted in the second housing for creating an air flow through the fuel cell housing and the second housing. The carbon dioxide and water vapor generated by the fuel cell are drawn through the fuel cell housing and into the inlet end of the trap housing by the air flow, while insects attracted to the device are also drawn into the inlet end of the trap housing by the air flow. A mesh bag is secured around the outlet end of the second housing for trapping insects drawn into the trap housing.

8 Claims, 2 Drawing Sheets

INSECT TRAP INCLUDING METHANOL FUEL CELL FOR GENERATING CARBON DIOXIDE AND WATER VAPOR AS ATTRACTANTS

BACKGROUND AND SUMMARY OF THE INVENTION

The instant invention relates to traps for capturing and destroying hematophagous insects, and more particularly relates to an insect trap including a methanol fuel cell for generating carbon dioxide and water vapor for the attraction of insects to the trap.

It is well known in the insect trapping art that hematophagous insects are attracted to their hosts by sensing carbon dioxide, and other various chemical attractants present in the air. Accordingly, carbon dioxide, among other chemicals, has been used in a variety of insect trapping devices as an attractant. In this regard, the prior art traps have in general supplied carbon dioxide by releasing carbon dioxide from tanks, or by allowing dry ice to gradually sublimate. Although these methods of supplying carbon dioxide are effective, the associated tanks and/or holding containers tend to be quite large and difficult to handle, and thus have detracted from the commercial success of such devices.

The instant invention provides an insect trapping device for hematophagous insects which utilizes a methanol fuel cell to provide carbon dioxide, water vapor, and heat as attractive agents, and which further utilizes electricity generated by the fuel cell to power the electrical components of the trap, thus eliminating the need for an external power source. The methanol fuel cell is mounted in a tubular housing having inlet and outlet ends. Associated blower and pump devices are utilized to respectively provide the necessary air flow, and a water/methanol feed stream to the fuel cell. The fuel cell is operative for oxidizing the oxygen and methanol, and thereby generating carbon dioxide, water vapor and heat as reaction products, as well as electricity. The inlet end of a tubular trap housing is mounted in spaced adjacent relation to the outlet end of the fuel cell housing. A fan, powered by electricity generated by the fuel cell, is mounted in the trap housing for creating an air flow through the trap housing as well for drawing the carbon dioxide, water vapor and heat in the fuel cell housing into the inlet end of the trap housing. Insects attracted to the device by the presence of the reaction products are drawn into the inlet end of the trap housing by the air flow. A mesh bag is secured around the lower outlet end of the trap housing for trapping insects drawn into the trap housing. The trap further includes associated electronic control means for controlling operation of the trap, including operation of the suction fan. The electronic control is also powered by electricity generated by the fuel cell thereby making the trap completely self-sufficient from any external power source.

Accordingly, among the objects of the invention are the provision of an insect trapping device including means for generating carbon dioxide and water vapor as an insect attractant; the provision of such an apparatus wherein the carbon dioxide and water vapor are supplied by a methanol fuel cell; the provision of such an insect trapping device wherein the methanol fuel cell provides electricity to power associated fans and pumps of the device thereby making the trapping device self-sufficient and free of the needs of an external power source; and the provision of such an insect trap wherein the carbon dioxide and water vapor are drawn through a suction trap for capture of insects in a disposable bag.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
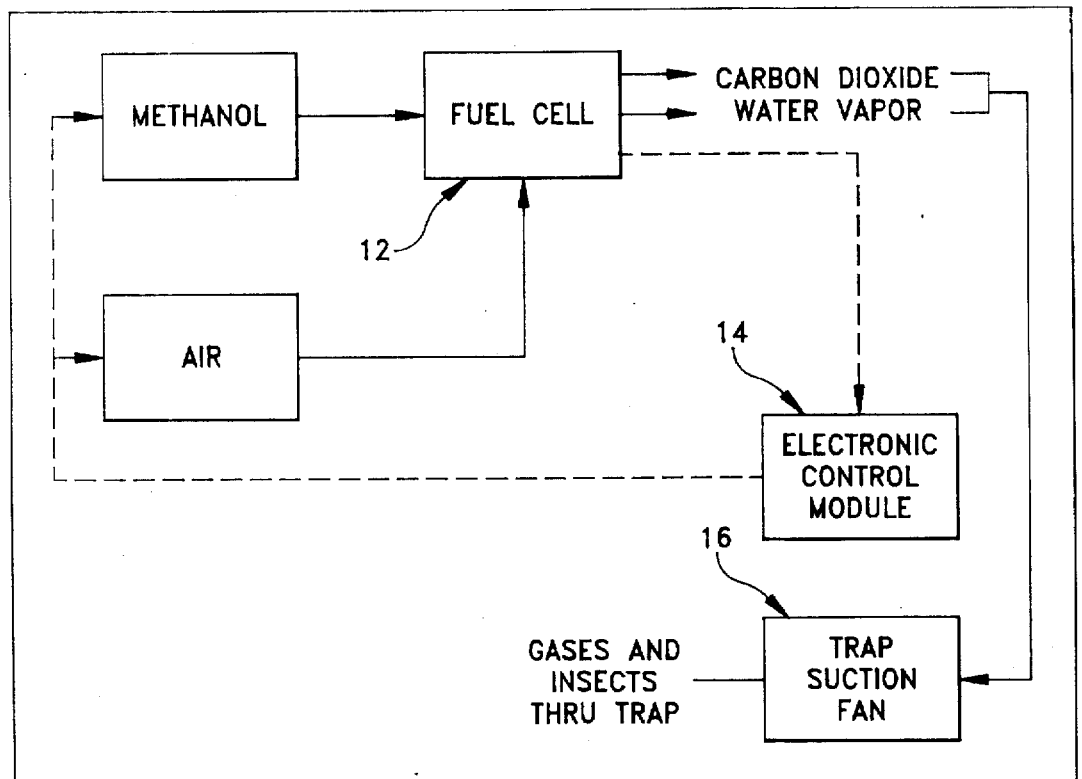
FIG. 1 is a schematic diagram of the instant insect trap.
Figure 3:
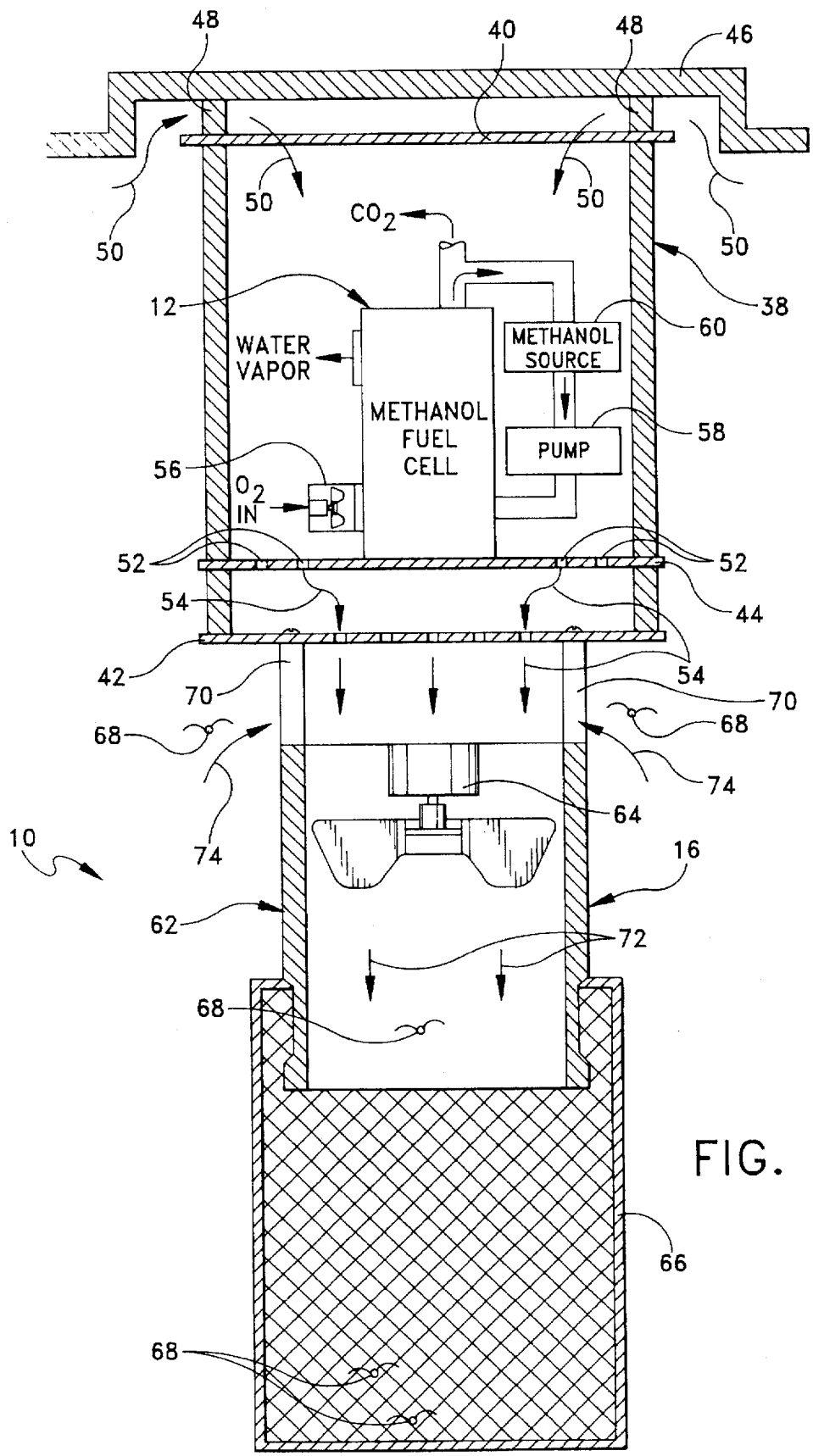
FIG. 3 is a cross-sectional view of the insect trap of the instant invention.

Referring now to the drawings, the insect trap of the instant invention is illustrated and generally indicated at 10 in FIGS. 1 and 3. As will hereinafter be more fully described, the instant insect trap 10 utilizes a methanol fuel cell to generate carbon dioxide gas, water vapor and heat as attractants, and to further generate electricity to power associated fans and pumps of the trap.

The insect trap 10 comprises a methanol fuel cell generally indicated at 12, an electronic control module generally indicated at 14, and a fan trap assembly generally indicated at 16.

Figure 2:
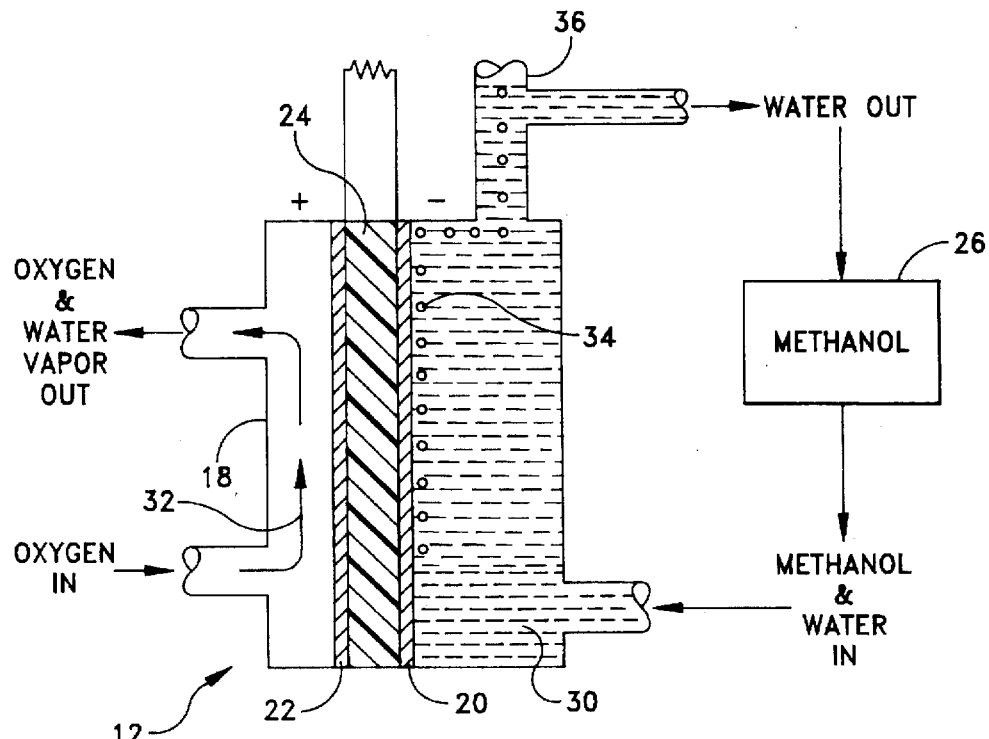
FIG. 2 is a cross-sectional view of a methanol fuel cell.

Referring to FIG. 2, the methanol fuel cell 12 comprises a closed vessel 18, an anode 20, a cathode 22, a membrane 24 disposed between the anode 20 and cathode 22, means for supplying oxygen to a surface of the cathode 22, and means for supplying methanol 26 to a surface of the anode. The fuel cell 12 is operative for generating electricity from a direct liquid feed stream of methanol/water solution 30 circulated in contact with the anode 20, plus a direct gaseous feed stream of air or oxygen 32 in contact with the cathode 22. The membrane 24 in the cell 12 functions as an electrolyte, and comprises a perfluorinated polymeric membrane that can be maintained conductive by contact with the methanol/water solution. The electrolyte membrane 24 serves as a both a proton exchange medium, and a barrier that resists diffusion of methanol to the cathode. The membrane 24 also acts as a separator between the anode 20 and cathode 22. The membrane 24 and the electrodes 20, 22 are formed into a unit by hot-pressing them together. The anode 20 contains a platinum/ruthenium alloy that acts as a catalyst for the anode half-cell reaction (electro-oxidation of methanol), and is preferably structured to permit the methanol, water, carbon dioxide, and hydrogen ions to diffuse through it. The cathode 22 contains platinum, which acts as a catalyst for the cathode half-cell reaction (electro-oxidation of oxygen), and it is also structured to permit gases to diffuse through it. Carbon dioxide generated in the anode half-cell reaction diffuses out of the anode 20 and forms bubbles 34 that escape by rising through the methanol/water feed stream and exiting through an outlet 36.

Referring now to FIG. 3, the methanol fuel cell 12 is mounted in a tubular housing generally indicated at 38 having inlet and outlet ends 40 and 42 respectively. More specifically, the fuel cell 12 is mounted on the upper surface of an interior wall 44 of the housing 38. The inlet end 40 of the housing 38 is open to allow air flow into the housing 38. The inlet end 40 is further provided with a cover 46 which is attached to the housing by standoffs 48 to allow air flow (arrows 50) under the cover 46 and into the housing 38. The cover 46 effectively prevents rain and debris from entry into the interior of the housing 38. The interior wall 44 is provided with a plurality of openings 52 around the peripheral edge thereof to permit air flow (arrows 54) out of the housing 38. The fuel cell 12 still further includes a blower 56 and a pump 58 which are utilized to respectively provide the necessary air flow and a water feed stream to the fuel cell 12. The methanol 26 is fed into the water feed stream by means of a gravity drip source 60.

In accordance with the above-described principles of operation, the fuel cell 12 is operative for oxidizing oxygen and methanol, and thereby generating carbon dioxide, water vapor and heat as reaction products, as well as electricity. The carbon dioxide, water vapor and heat are released into the interior of the housing 38 where they are subsequently drawn downwardly into the fan trap assembly 16 as will be described hereinbelow.

The fan trap assembly 16 comprises a tubular housing generally indicated at 62, an electric fan 64 mounted in the housing 62, and a mesh bag 66 for capturing insect 68 drawn into the trap assembly 16. The inlet end of the trap housing 62 is mounted in spaced adjacent relation to the outlet end 42 of the fuel cell housing 38 by standoffs 70. The fan 64, which is powered by electricity generated by the fuel cell 12, is effective for creating an air flow (arrows 72) in a downward direction through the trap housing 62, as well for drawing the carbon dioxide and water vapor in the fuel cell housing 38 into the inlet end of the trap housing 62. Insects 68 attracted to the trap 10 by the presence of the reaction products in the surrounding air, are drawn into the inlet end of the trap housing 62 by a suction draft (arrows) 74 created by the fan 64. The mesh bag 66 is secured around the lower outlet end of the trap housing 62 for trapping insects 68 drawn into the trap housing 62. The mesh bag 66 is fine enough to trap the insects 68, yet permits sufficient air flow for proper operation of the fan 64. The electronic control means 14 is operative for controlling overall operation of the trap 10, including operation of the fans 56 and 64, and pump 58. The electronic control 14 is also powered by electricity generated by the fuel cell 12 thereby making the trap 10 completely self-sufficient from any external power source. The electronic control 14 further includes a photoelectric sensing means (not shown) for permitting automatic operation of the device 10 according to ambient light conditions.

While the instant trapping arrangement is specifically described as a suction-type fan trap, it is to be understood that the device may alternatively include other types of trapping and/or eradication devices including but not limited to electrocution grids, sticky boards, mechanical shredders, and contact pesticide surfaces, the ultimate purpose of these devices being to prevent the insects from returning to the external environment.

It can therefore be seen that the instant invention provides an effective insect trapping device 10 which is virtually self-sufficient in the generation of insect attractants, and in the generation of electricity for powering the various components of the device. The methanol fuel cell 12 provides an effective means for generating carbon dioxide, water vapor and heat, which are known insect attracts, and for generating electricity to provide power to the electronic controls 14, fans 56, 64 and pump 58 of the device, while the suction fan assembly 16 provides an effective means for trapping insects 68 attracted to the device by the release of the attractants into the surrounding air. In operation, it is contemplated that the methanol reservoir 26 will need to be replaced periodically, somewhere on the nature of once a week, or once a month, and that the insect collection bag 66 will need to be emptied periodically. Otherwise, the device 10 will be essentially self-operative, with day and night operation of the device being controlled by the photo-electric sensor. For these reasons, the instant invention is believed to represent a significant advancement in the insect trapping art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

I claim:

1. An insect trap comprising:

methanol fuel cell means for oxidizing oxygen and methanol, and thereby generating gaseous carbon dioxide, water vapor, and heat as reaction products of said oxidations; and means in association with said fuel cell means for preventing insects attracted to said reaction products from returning to the surrounding environment.

2. The insect trap of claim 1, wherein said methanol fuel cell means comprises an anode, a cathode, a proton exchange membrane disposed between said cathode and said anode, means for supplying oxygen to a surface of said cathode, and means for supplying methanol to a surface of said anode.

3. The insect trap of claim 2 wherein said means for preventing said insects from returning to the surrounding environment comprises trapping means for trapping said insects in a predetermined location.

4. The insect trap of claim 3 wherein said means for trapping said insects comprising a tubular housing, fan means mounted in said housing for creating an air flow through said housing, said insects being drawn into an inlet end of said housing by said air flow, said means for trapping said insect further comprising bag means secured around an outlet end of said housing for trapping said insects.

5. The insect trap of claim 1 wherein said means for preventing said insects from returning to the surrounding environment comprises trapping means for trapping said insects in a predetermined location.

6. The insect trap of claim 5 wherein said means for trapping said insects comprising a tubular housing, fan means mounted in said housing for creating an air flow through said housing, said insects being drawn into an inlet end of said housing by said air flow, said means for trapping said insect further comprising bag means secured around an outlet end of said housing for trapping said insects.

7. An insect trap comprising:

a first tubular housing having an inlet end and an outlet end;

methanol fuel cell means mounted in said housing for oxidizing oxygen and methanol, and thereby generating carbon dioxide, water vapor and heat as reaction products of said oxidations;

a second tubular housing having an inlet end and an outlet end, said inlet end of said second tubular housing being secured in spaced adjacent relation to the outlet end of said first tubular housing;

fan means mounted in said second tubular housing for creating an air flow through said first and second housings, said carbon dioxide and said water vapor being drawn out of the outlet end of said first housing and into the inlet end of said second housing by said air flow, said insects being drawn into the inlet end of said second housing by said air flow;

bag means secured around the outlet end of said second housing for trapping said insects.

8. The insect trap of claim 7, wherein said methanol fuel cell means comprises an anode, a cathode, a proton exchange membrane disposed between said cathode and said anode, means for supplying oxygen to a surface of said cathode, and means for supplying methanol to a surface of said anode.

* * * * *